(12) United States Patent
Takano et al.

(10) Patent No.: US 11,454,998 B2
(45) Date of Patent: Sep. 27, 2022

(54) POWER CONTROL SEMICONDUCTOR DEVICE AND VARIABLE OUTPUT VOLTAGE POWER SUPPLY

(71) Applicants: Yoichi Takano, Hadano (JP); Shinichiro Maki, Hiratsuka (JP); Katsuhiro Yokoyama, Atsugi (JP)

(72) Inventors: Yoichi Takano, Hadano (JP); Shinichiro Maki, Hiratsuka (JP); Katsuhiro Yokoyama, Atsugi (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 152 days.

(21) Appl. No.: 16/920,309

(22) Filed: Jul. 2, 2020

(65) Prior Publication Data
US 2021/0034088 A1 Feb. 4, 2021

(30) Foreign Application Priority Data
Jul. 30, 2019 (JP) .............................. JP2019-139655

(51) Int. Cl.
*G05F 1/575* (2006.01)
*H02M 3/158* (2006.01)
(Continued)

(52) U.S. Cl.
CPC .............. *G05F 1/575* (2013.01); *G05F 1/561* (2013.01); *G05F 1/59* (2013.01); *H02M 3/158* (2013.01)

(58) Field of Classification Search
CPC ............ G05F 1/575; G05F 1/561; G05F 1/59; H02M 3/158; H02M 3/155
(Continued)

(56) References Cited

U.S. PATENT DOCUMENTS 7,088,172 B1 * 8/2006 Lesea ...................... G05F 3/205
327/276
8,665,020 B2 3/2014 Sakurai et al.
(Continued)

FOREIGN PATENT DOCUMENTS

JP 2006320110 A 11/2006
JP 2017134557 A 8/2017

OTHER PUBLICATIONS

Received STIC search report from EIC 2800 searcher Angela Brooks dated Jul. 8, 2019. (Year: 2019).*
(Continued)

*Primary Examiner* — Shawki S Ismail
*Assistant Examiner* — Htet Z Kyaw
(74) *Attorney, Agent, or Firm* — Holtz, Holtz & Volek PC

(57) ABSTRACT

A power control semiconductor device includes a voltage control transistor, a control circuit, a bias circuit, and external terminals. The voltage control transistor is connected between a voltage input terminal and an output terminal. The bias circuit generates a voltage that operates the control circuit. Output control signals provided from an outside are input to the external terminals to control an output voltage. The control circuit includes an error amplifier and a logic circuit. The error amplifier outputs a voltage corresponding to a potential difference between a reference voltage and a voltage divided by a voltage divider that divides the output voltage. The logic circuit generates: a signal that changes the divided voltage in accordance with the output control signals; and a signal that stops operation of the bias circuit in response to a combination of the output control signals.

16 Claims, 4 Drawing Sheets

(51) Int. Cl.
*G05F 1/59* (2006.01)
*G05F 1/56* (2006.01)

(58) Field of Classification Search
USPC .......................................................... 323/282
See application file for complete search history.

(56) References Cited

U.S. PATENT DOCUMENTS

| | | | |
|---|---|---|---|
| 8,786,317 | B2 | 7/2014 | Terada et al. |
| 8,847,569 | B2 | 9/2014 | Terada et al. |
| 8,872,490 | B2 * | 10/2014 | Yoshikawa ............. G06F 1/189 |
| | | | 323/273 |
| 9,606,556 | B2 | 3/2017 | Takano et al. |
| 9,952,610 | B1 | 4/2018 | Yokoyama et al. |
| 9,996,093 | B2 | 6/2018 | Takano et al. |
| 10,063,135 | B2 | 8/2018 | Maki et al. |
| 10,296,034 | B2 | 5/2019 | Sakurai et al. |
| 10,466,728 | B2 | 11/2019 | Maki et al. |
| 2004/0051509 | A1 * | 3/2004 | Matsuo .................... G05F 1/56 |
| | | | 323/282 |
| 2008/0054995 | A1 * | 3/2008 | Lin .......................... G05F 3/30 |
| | | | 327/539 |
| 2010/0237956 | A1 * | 9/2010 | Miyashita ............ H03B 5/1228 |
| | | | 331/108 R |
| 2010/0320980 | A1 * | 12/2010 | Terada .................... G05F 1/575 |
| | | | 323/282 |
| 2011/0009171 | A1 * | 1/2011 | Watanabe ................. G05F 1/56 |
| | | | 455/573 |
| 2012/0062198 | A1 * | 3/2012 | Takano .................... H02M 1/36 |
| | | | 323/282 |
| 2013/0002220 | A1 * | 1/2013 | Terada ..................... G05F 1/56 |
| | | | 323/282 |
| 2017/0063232 | A1 * | 3/2017 | Takano ................ H02M 3/158 |
| 2017/0192447 | A1 * | 7/2017 | Kimura ..................... G05F 3/16 |
| 2018/0097439 | A1 * | 4/2018 | Maki ...................... H02M 1/32 |
| 2019/0302821 | A1 | 10/2019 | Maki et al. |
| 2019/0393773 | A1 | 12/2019 | Terada et al. |
| 2020/0266799 | A1 * | 8/2020 | Bako .................. H03F 3/45475 |

OTHER PUBLICATIONS

U.S. Appl. No. 16/861,340; First Named Inventor: Shinichiro Maki; Title: "Power Control Semiconductor Device, Variable Output Voltage Power Supply, and Designing Method"; filed Apr. 29, 2020.

* cited by examiner

POWER CONTROL SEMICONDUCTOR DEVICE AND VARIABLE OUTPUT VOLTAGE POWER SUPPLY

CROSS REFERENCE TO RELATED APPLICATION

This application is based upon and claims the benefit of priority under 35 USC 119 of Japanese Patent Application No. 2019-139655 filed on Jul. 30, 2019, the entire disclosure of which, including the description, claims, drawings and abstract, is incorporated herein by reference in its entirety.

BACKGROUND OF THE INVENTION

1. Field of the Invention

The present invention relates to a series power supply. In particular, the present invention is effectively applied to a power control semiconductor device of the series regulator type and a variable output voltage power supply in which an output voltage is changed in several levels.

2. Description of Related Art

A series regulator (hereinafter, abbreviated as "regulator") is one of power supplies that output a direct current voltage of a desired potential by controlling a transistor between a direct current voltage input terminal and an output terminal. This regulator is used in a constant voltage power supply that supplies a DC power source to, for example, a cooling blower (fan), a light, and the like which are mounted on electronics. In recent years, electronics such as a personal computer have more speed and higher function, which increases demand for cooling fans.

Electronics equipped with a blower (fan) sometimes need an additional function of changing a blowing amount i.e. cooling performance by stepwise changing a voltage for driving a motor that rotates a fan. In that case, a regulator should have a function to change an output voltage stepwise.

Conventionally, there has been inventions of a regulator that changes an output voltage, for example, the one in JP2006-320110A.

A regulator described in JP2006-320110A selects and outputs one of three different levels of an output voltage in accordance with an input level of a control voltage.

However, this regulator switches the output voltage stepwise by inputting a control voltage from the outside. Therefore, in a case in which a common microcomputer is used as a device that generates the control voltage to be input, a highly functional microcomputer with a built-in digital-analog converter is required. It causes a problem of increasing cost.

As a method for switching an output voltage stepwise with a microcomputer that does not have a built-in digital-analog converter, an output voltage may be switched by inputting a control signal of some bits into a power control semiconductor device constituting a regulator. However, in this case, multiple control input terminals are required for the power control semiconductor device. It causes a problem of increasing chip size.

On the other hand, in order to reduce or almost eliminate standby current consumption of a power supply, a function of turning on/off a power control semiconductor device constituting a regulator with a control signal from the outside is required. In this case, the power control semiconductor device must be provided with a separate terminal to which an on/off control signal is input from the outside.

A semiconductor integrated circuit for a regulator which has a terminal to which an on/off control signal is input is described in, for example, JP2017-134557A. In a regulator of JP2017-134557A, an on/off control signal from the outside turns off a bias circuit that supplies an operation voltage to internal circuits such as an error amplifier and a reference voltage circuit. Thereby operation of the regulator is stopped.

To switch an output voltage with a control signal of some bits and to turn on/off a power control semiconductor device with an on/off control signal from the outside, the power control semiconductor device is provided with separate terminals to which the signals are input respectively. This increases the number of external terminals. It causes a problem of increasing chip size, which results in increasing package size.

SUMMARY OF THE INVENTION

The present invention has been made in view of the above problems. An object of the present invention is to provide a power control semiconductor device and a variable output voltage power supply with a few external terminals in which a control signal from the outside changes an output voltage stepwise and turns on/off the device.

Another object of the present invention is to provide a power control semiconductor device and a variable output voltage power supply which easily control an output voltage with a microcomputer that does not have a built-in digital-analog converter.

To achieve at least one of the abovementioned objects, according to an aspect of the present invention, a power control semiconductor device includes:

a voltage input terminal to which a DC voltage is input;

an output terminal;

a voltage control transistor connected between the voltage input terminal and the output terminal;

a control circuit that controls the voltage control transistor in accordance with an output voltage of the output terminal;

a bias circuit that generates a voltage that operates the control circuit based on the DC voltage input to the voltage input terminal; and two or more external terminals to which output control signals provided from an outside are input to control the output voltage, wherein the control circuit includes:

a voltage divider that divides the output voltage of the output terminal;

an error amplifier that outputs a voltage corresponding to a potential difference between a predetermined reference voltage and a voltage divided by the voltage divider; and a logic circuit that generates:

a signal or a voltage that changes the voltage divided by the voltage divider, which is input to the error amplifier, in accordance with two or more output control signals input to the two or more external terminals; and a signal or a voltage that stops operation of the bias circuit in response to one of combinations of the two or more output control signals.

According to the power control semiconductor device having the above configuration, the output control signals from the outside change the output voltage stepwise. In accordance with one of the combinations of the two or more output control signals, the logic circuit stops operation of the bias circuit that generates the operation voltage of the control circuit. The internal circuit is turned on/off without an external terminal (including an IC pad) exclusively for turning on/off. Since the output voltage is changed stepwise with a few external terminals, the package becomes smaller. Power consumption is reduced by turning off internal circuits in a standby mode. An inexpensive microcomputer without a built-in digital-analog converter can be used as a power controller. An input/output function (common port) of the microcomputer switches the output voltage and controls on/off of power.

The voltage divider may include a first resistor element and a resistance circuit which are connected in series between the output terminal and a ground point, the resistance circuit may include a switch element and a resistor element in series, and the switch element may be turned on/off by the signal or the voltage from the logic circuit.

The resistance circuit may include lines each consisting of the switch element and the resistor element in series, and the switch elements may be turned on/off by the signal or the voltage from the logic circuit.

According to the above configuration, in a case in which the output control signal input from the outside consists of, for example, two bits, three levels of output voltage are output. In a case in which the output control signal consists of three bits, seven levels of output voltage are output. Voltage values can be freely set.

The voltage divider may consist of a first resistor element and a resistance circuit which are connected in series between the output terminal and a ground point, the resistance circuit may include:

resistor elements in series; and a switch element connected between the ground point and a connection node between the resistor elements, each of the resistor elements may be constituted by a series resistance circuit in which unit resistors each having a predetermined resistance value are connected in series, and the switch element may be turned on/off by the signal or the voltage from the logic circuit.

The resistance circuit may include a plurality of switch elements each connected between the ground point and the connection node between the resistor elements, and the plurality of switch elements may be turned on/off by the signal or the voltage from the logic circuit.

According to the above configuration, in a case in which the series resistance circuit in which the unit resistors each having a predetermined resistance value are connected in series is used as the resistor element for dividing voltages, the number of unit resistors used is reduced. Thus, an occupied area of the resistance circuit is reduced.

The logic circuit may include:

two or more transistors that are turned on/off by the two or more output control signals input respectively to the two or more external terminals; and two or more current sources respectively connected in series with the transistors, and when operation of the bias circuit is stopped by the signal or the voltage from the logic circuit, currents of the two or more current sources are interrupted.

According to the above configuration, the bias circuit is turned off by control of output from the logic circuit having a simple logical function. The power control semiconductor device is shifted to a low power consumption mode in which operation is stopped.

According to another aspect of the invention, a variable output voltage power supply includes:

the power control semiconductor device having the above configuration; and a controller that outputs the output control signals that are to be input to the two or more external terminals, wherein the output voltage is changed in accordance with the output control signals input to the two or more external terminals from the controller.

According to the variable output voltage power supply having the above configuration, input of the control signals from the outside changes the output voltage stepwise and stops operation of the power control semiconductor device. It enables variable control of the output voltage and termination control of the power supply by an input/output function of a microcomputer.

According to the power control semiconductor device and the variable output voltage power supply according to the invention, although the device has a few external terminals, control signals from the outside change the output voltage stepwise and turn on/off the device. The present invention brings advantageous effect that an inexpensive microcomputer without a built-in digital-analog converter easily controls an output voltage and on/off of a power control semiconductor device and a variable output voltage power supply.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, preferred embodiments of the present invention will be described with reference to the drawings.

Figure 1:
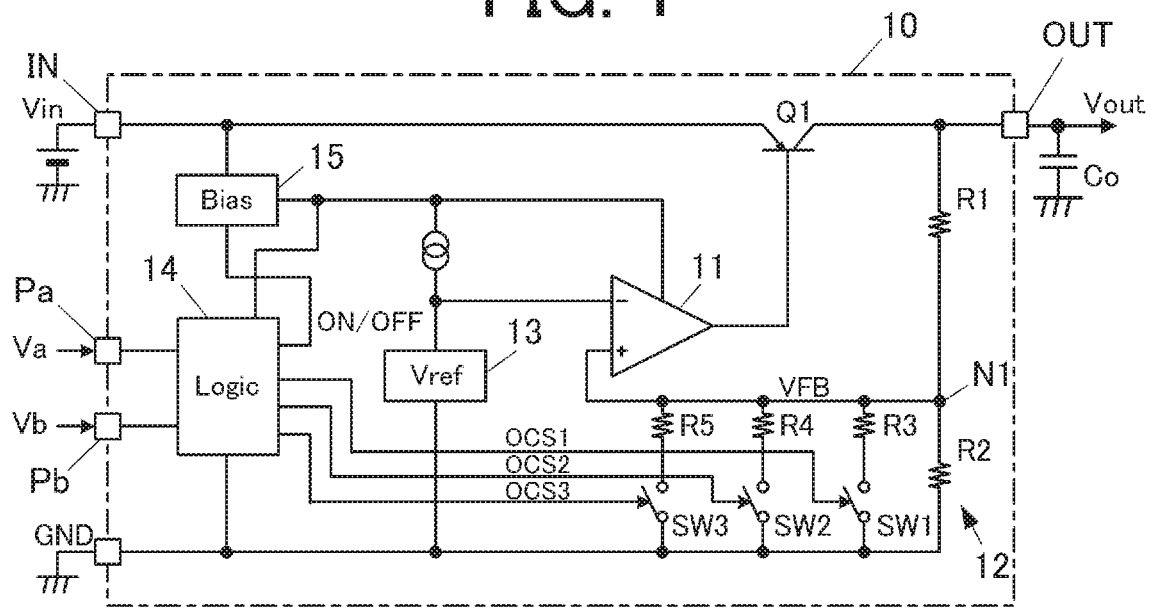
FIG. 1 is a circuit diagram showing an embodiment of a variable output voltage power supply of the series regulator type according to the present invention.

FIG. 1 shows an embodiment of a series regulator as a variable output voltage power supply according to the invention. The portion surrounded by a chain line in FIG. 1 is formed as a semiconductor integrated circuit (regulator IC) 10 on a semiconductor chip, such as single crystal silicon. A capacitor Co is connected to an output terminal OUT of the regulator IC 10. Thus, the regulator IC 10 functions as a variable output voltage power supply that outputs a stable DC voltage to loads such as a fan motor (not shown).

In the following explanation, an example in which a bipolar transistor is used as a transistor constituting the regulator IC 10 is shown. However, a MOS transistor may be used.

In the variable output voltage power supply of the embodiment, as shown in FIG. 1, a PNP bipolar transistor Q1 for voltage control is connected between the output terminal OUT and the voltage input terminal IN to which a direct current input voltage Vin of the regulator IC 10 is applied. Resistors R1, R2 constituting a voltage divider 12 that divides an output voltage Vout are connected in series between the output terminal OUT and a ground line (ground point) to which a ground potential GND is applied.

A voltage of a connection node N1 between the resistors R1, R2 constituting the voltage divider 12 is input as a feedback voltage VFB to a non-inversion input terminal of an error amplifier 11 as an error amplification circuit that controls a gate terminal of the voltage control transistor Q1. A predetermined reference voltage Vref generated by a reference voltage circuit 13 based on an input voltage Vin is applied to an inversion input terminal of the error amplifier 11. The error amplifier 11 generates a voltage corresponding to a potential difference between the feedback voltage VFB of output and the reference voltage Vref, and supplies the generated voltage to a gate terminal of the voltage control transistor Q1. Thus, the error amplifier 11 controls Q1 so that the output voltage Vout reaches a desired potential.

In the regulator IC 10 of the embodiment, three circuits are connected in parallel between a ground point and a connection node N1 between the resistors R1, R2. The three circuits are: (i) "resistor R3—switch element SW1" which is a series circuit in which a resistor R3 and a switch element SW1 are connected; (ii) "resistor R4—switch element SW2" which is a series circuit in which a resistor R4 and a switch element SW2 are connected; and (iii) "resistor R5—switch element SW3" which is a series circuit in which a resistor R5 and a switch element SW3 are connected. Resistance values of the resistors R3, R4, R5 are set at different values. The regulator IC 10 is provided with control input terminals Pa, Pb as external terminals to which control signals Va, Vb sent from a microcomputer or the like (not shown) are input. The regulator IC 10 is further provided with a logic circuit 14 that generates signals OCS1-OCS3 for controlling the switch elements SW1-SW3 based on the input control signals Va, Vb of the control input terminals Pa, Pb. The resistor R2 may be omitted.

The regulator IC 10 of the embodiment is provided with a bias circuit 15 that generates a current that operates the error amplifier 11 and the reference voltage circuit 13. The logic circuit 14 has a function of generating a signal ON/OFF which is a logical sum of the input control signals Va, Vb of the control input terminals Pa, Pb and which turns on/off the bias circuit 15. When both of the input control signals Va, Vb are at a low level, the output signal ON/OFF is at a high level. It turns off the bias circuit 15. In the embodiment, when either Va or Vb is at a high level, the output signal ON/OFF of the logic circuit 14 is at a low level. It turns on the bias circuit 15.

When the output signal ON/OFF of the logic circuit 14 turns off the bias circuit 15, supply of currents that operates the error amplifier 11, the reference voltage circuit 13, and the logic circuit 14 is stopped. Thus, operation of these internal circuits is stopped.

In the regulator IC 10 of the embodiment, the control signals OCS1-OCS3 output from the logic circuit 14 selectively turns on one of the switch elements SW1-SW3. Then, one of the resistors R3, R4, R5 is connected in parallel with the resistor R2 constituting the voltage divider 12. A part of the current flowing through the resistor R2 flows through the resistor R3, R4, R5. It changes the division ratio of the output voltage Vout divided by the voltage divider 12. Thus, a base voltage of the voltage control transistor Q1 is controlled, and an output current is changed.

Consequently, the output voltage Vout output from the output terminal OUT of the regulator IC 10 is changed in three levels in accordance with the input control signals Va, Vb of the control input terminals Pa, Pb.

The voltage control transistor Q1 is controlled so that:
the division ratio of the voltage divider 12 is changed by turning on/off the switch elements SW1-SW3; and
the potential of the node N1 is rapidly shifted to the same potential as the reference voltage Vref by effect of imaginary short-circuit of the error amplifier 11.

Figure 2:
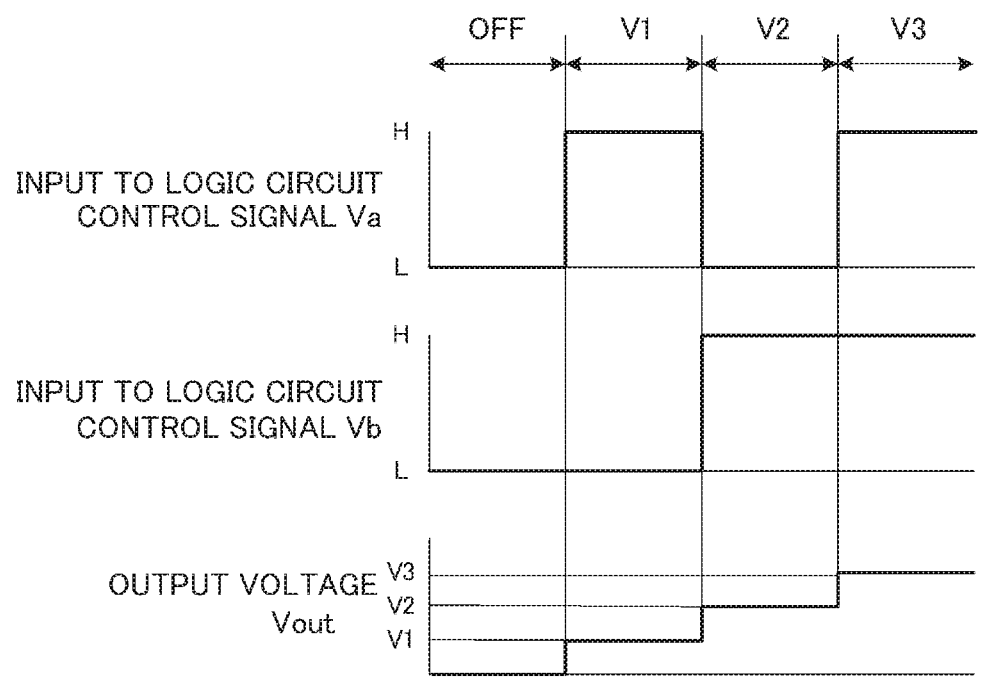
FIG. 2 is a wave diagram showing relation between control signals Va, Vb and an output voltage Vout in a regulator of the embodiment.

Table 1 is a truth table showing relation of the input control signals Va, Vb, levels of the output voltage Vout, and an off-mode of the bias circuit 15. FIG. 2 shows an example of waveform diagram.

TABLE 1

| Va | Vb | Bias | OCS1 | OCS2 | OCS3 | Vout |
|----|----|------|------|------|------|------|
| L  | L  | OFF  | —    | —    | —    | OFF  |
| L  | H  | ON   | H    | L    | L    | V1   |
| H  | L  | ON   | L    | H    | L    | V2   |
| H  | H  | ON   | L    | L    | H    | V3   |

As shown in FIG. 2, according to the regulator of the embodiment, the output voltage Vout changes in three levels V1, V2, V3 (V1<V2<V3) in accordance with combinations of levels of the input control signals Va, V b.

The circuit in FIG. 1 includes three lines connected in parallel with the resistor R2. The three lines are (i) the "resistor R3—switch element SW1" line, (ii) the "resistor R4—switch element SW2" line, and (iii) the "resistor R5—switch element SW3" line. Alternatively, a couple of "resistor—switch element" lines may be provided to change the output voltage Vout in three levels. The control signals OCS1-OCS3 output from the logic circuit 14 control the output voltage Vout in three conditions. The three conditions are (i) a condition in which only SW1 is turned on, (ii) a condition in which only SW2 is turned on, and (iii) a condition in which SW1 and SW2 are turned on. In this case, the output voltage Vout in the condition in which SW1 and SW2 are turned on depends on resistance values of the two resistors R2, R3 and cannot be freely set. However, according to the above embodiment in which three "resistor—switch element" lines are provided, all three levels of voltage can be freely set. It is advantageous.

Figure 3A:
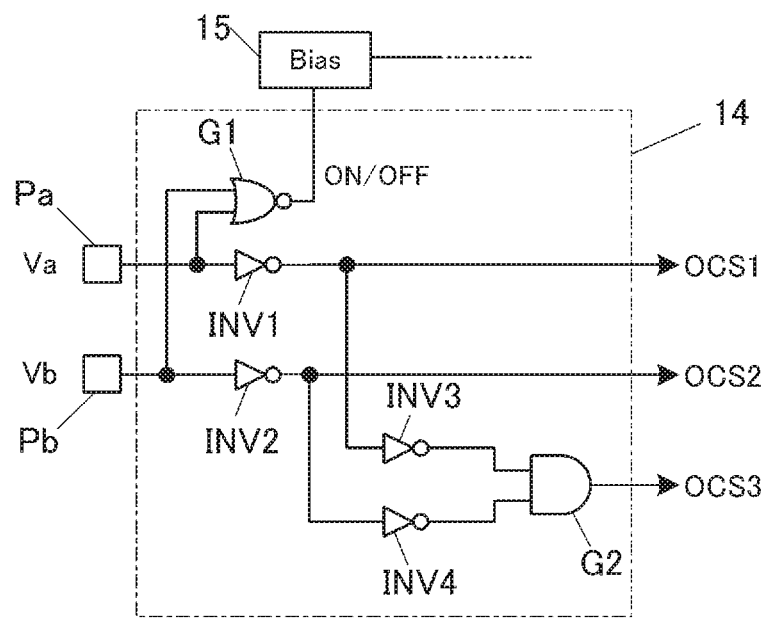
FIG. 3A is a logic diagram showing an example of a logic circuit constituting the regulator IC of the embodiment.
Figure 3B:
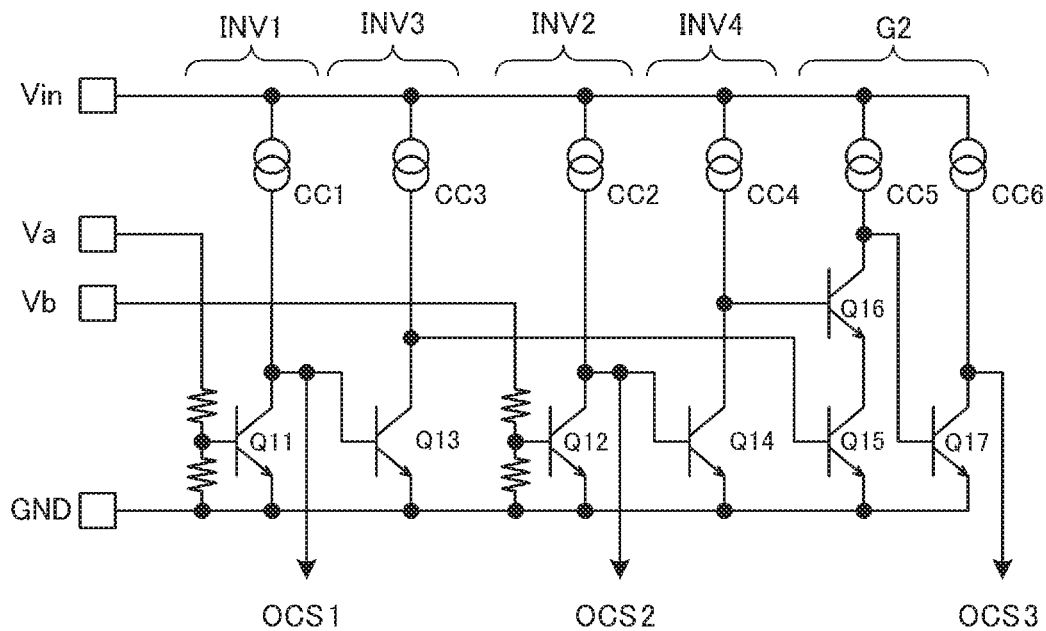
FIG. 3B is a circuit diagram showing an example of the logic circuit (except G1).

FIG. 3A is a logic diagram of the logic circuit 14 that generates the control signals OCS1-OCS3 of the switch elements SW1-SW3 in accordance with Table 1. FIG. 3B is an example of the circuits of the logic circuit 14 except for a NOR gate G1.

As shown in FIG. 3A, the logic circuit 14 includes:
the NOR gate G1 that takes a logical sum of the input control signals Va, Vb to generate a signal ON/OFF that turns on/off the bias circuit 15;
two inverters INV1, INV2 that invert the input control signals Va, Vb to generate the control signals OCS1, OCS2;
inverters INV3, INV4 that invert outputs of the inverters INV1, INV2; and
an AND-gate G2 to which outputs of INV3, INV4 are input.

As shown in FIG. 3B, the inverters INV1, INV2 include:

two series resistors that divide the input control signals Va, Vb;

bipolar transistors Q11, Q12 including base terminals to which divided voltages are applied; and constant current sources CC1, CC2 connected in series with the transistors Q11, Q12.

The inverters INV3, INV4 include:

bipolar transistors Q13, Q14 including base terminals to which collector voltages of the transistors Q11, Q12 are applied; and constant current sources CC3, CC4 connected in series with the transistors Q13, Q14.

The AND gate G2 includes:

bipolar transistors Q15, Q16 in series which include base terminals to which collector voltages of the transistors Q13, Q14 are applied;

a bipolar transistor Q17 including a base terminal to which a collector voltage of the transistor Q16 is applied; and constant current sources CC5, CC6 connected in series with the transistors Q16, Q17.

The constant current sources CC1-CC6 consist of transistors on the secondary side of a current mirror circuit. The bias circuit 15 sends current to the primary side of the current mirror circuit.

Figure 4:
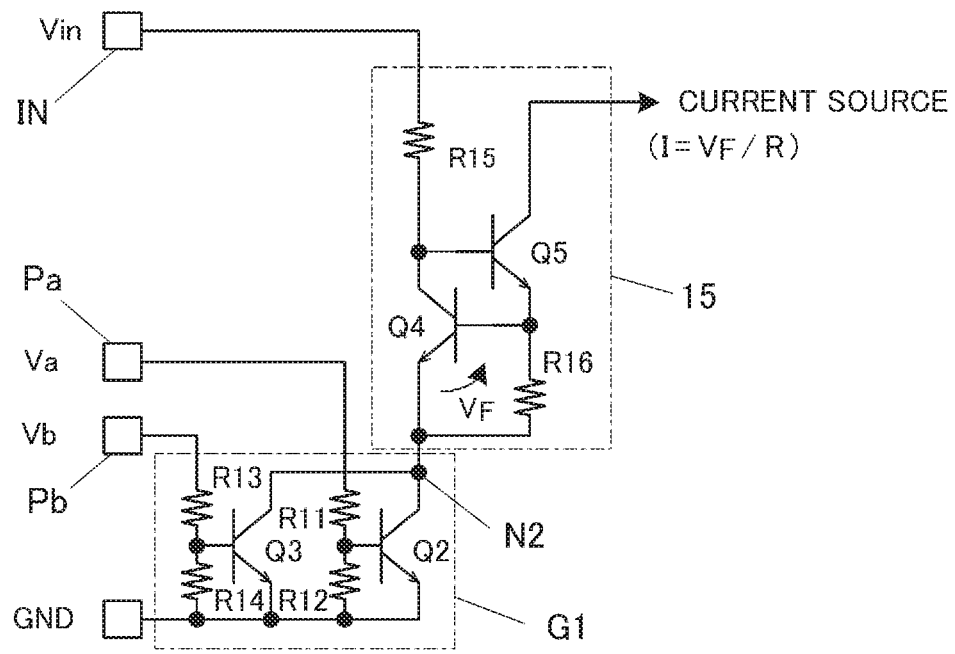
FIG. 4 is a circuit diagram showing an example of a bias circuit and a logic gate (NOR gate G1) constituting the logic circuit.

FIG. 4 is an example of the circuit of the bias circuit 15 and a circuit of the logic gate (NOR gate) G1 in the regulator IC 10 of the embodiment.

As shown in FIG. 4, the logic gate G1 includes:

resistors R11, R12 connected in series between a control input terminal Pa and a ground terminal GND;

an NPN bipolar transistor Q2 including a base terminal connected to a connection node between the resistors R11, R12;

resistors R13, R14 connected in series between a control input terminal Pb and the ground terminal GND; and an NPN bipolar transistor Q3 comprising a base terminal connected to a connection node between the resistors R13, R14.

Collector terminals of the transistors Q2, Q3 are connected to each other, and the connection point is an output node N2.

The bias circuit 15 includes:

a resistor R15 and an NPN bipolar transistor Q4 connected in series between a voltage input terminal IN and the output node N2 of the logic gate G1;

a resistor R16 connected between a base terminal and an emitter terminal of the transistor Q4; and an NPN bipolar transistor Q5 including a base terminal and an emitter terminal respectively connected to a collector terminal and the base terminal of the transistor Q4.

A collector terminal of the transistor Q5 is connected to a current source such as a current mirror circuit (not shown). When one of the transistors Q2, Q3 of the logic gate G1 is turned on, the potential of the node N2, which is the output of the logic gate G1, becomes lower. A collector current flows through Q4, and a current I of an amount represented by I=VF/R is subtracted from the current source (transistor on the primary side of the current mirror circuit) connected to the collector terminal of Q5. VF is a voltage between the base terminal and the emitter terminal of Q4. R is a resistance value of the resistor R15. Thus, the internal circuits are brought into operation condition. When both of the transistors Q2, Q3 of the logic gate G1 are turned off, the potential of the node N2, which is the output of the logic gate G1, becomes higher. No current flows through the transistor Q4. The current I subtracted from the current source connected to the collector terminal of Q5 is zero. Thus, operation of the internal circuits is stopped.

Next, an example of a variable output voltage power supply comprising the above regulator IC 10 with the control input terminals Pa, Pb and a common microcomputer will be described with reference to FIG. 5.

Figure 5:
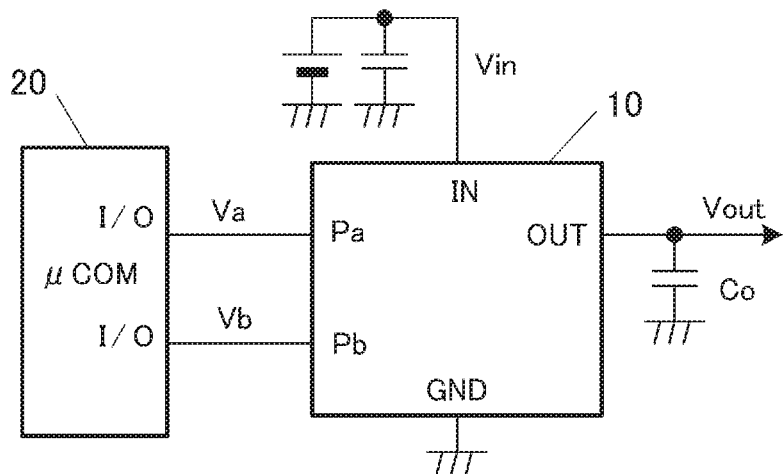
FIG. 5 is a block diagram showing an example of a power supply system consisting of the regulator of the embodiment and a microcomputer that controls the regulator.

In a case in which a variable output voltage power supply is constituted by the regulator IC 10 in the above embodiment and a common microcomputer, as shown in FIG. 5, portions are connected such that control signals Va, Vb are output from an input/output port of a microcomputer 20 and are input to the terminals Pa, Pb of the regulator IC 10. As shown in FIG. 2, the above connection realizes the variable output voltage power supply which changes the output voltage Vout in three levels in accordance with the control signals Va, Vb input to the control input terminals Pa, Pb and which stops operation of the regulator IC 10.

As described above, the regulator IC 10 of the embodiment can stop operation although the IC is not provided with an external terminal that stops operation of the IC, which is provided in the regulator IC in Patent Document 2. In a regulator IC that linearly changes the output voltage Vout, a control voltage must be input to an output control terminal from the outside. To generate the control voltage, a common microcomputer with a built-in digital-analog converter must be used. However, when the output voltage Vout is changed in three levels as in the regulator IC 10 of the above embodiment, a common port outputs the control signals. Therefore, an inexpensive microcomputer that does not have a built-in digital-analog converter can be used as the common microcomputer.

The regulator IC 10 of the above embodiment is provided with two control input terminals Pa, Pb and changes the output voltage Vout in three levels. However, the number of control input terminals is not limited to two. It may be three, four, or more.

For example, in a case in which three control input terminals are provided, the logic circuit 14 and the voltage divider 12 of the output voltage Vout are configured as follows.

(i) In a case in which all the control signals of three bits input to the input terminal are at a low level, the circuit is shifted to a mode in which operation of the regulator IC is stopped.

(ii) The output voltage Vout is changed in seven levels in accordance with other combinations.

Thus, a variable output voltage power supply controlled with a microcomputer that does not have a built-in digital-analog converter is realized.

Modification

Next, a modification example of a regulator IC 10 of the embodiment will be described with reference to FIG. 6.

Figure 6:
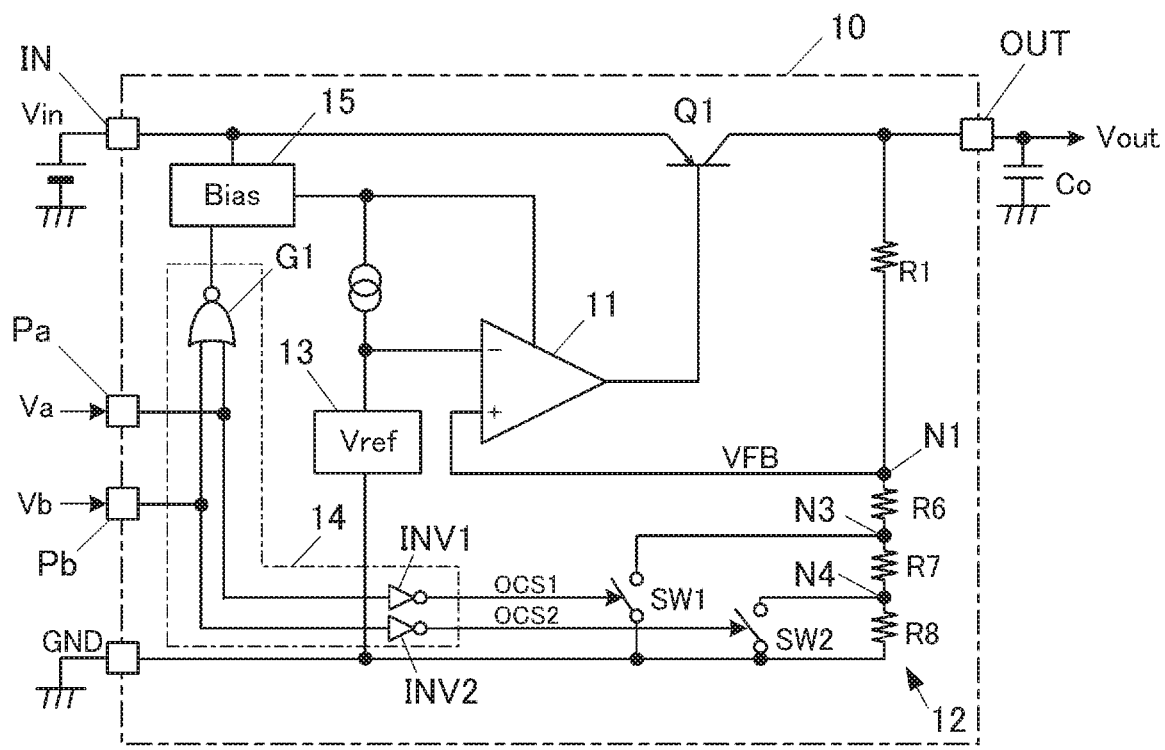
FIG. 6 is a circuit diagram showing a modification example of the regulator IC of the embodiment.

The modification example in FIG. 6 is provided with a voltage divider 12 connected between an output terminal OUT and a ground point of the regulator IC 10 like the above embodiment. The voltage divider 12 is constituted by a resistor R1 and resistors R6, R7, R8 in series. A switch element SW1 is provided between the ground point and a connection node N3 between the resistors R6, R7. A switch element SW2 is provided between the ground point and a connection node N4 between the resistors R7, R8. Inverters INV1, INV2 reverse control signals Va, Vb input to control input terminals Pa, Pb. Output signals OCS1, OCS2 of the inverters INV1, INV2 control on/off of the switch elements SW1, SW2.

Thus, the control signals Va, Vb control three conditions of (i) a condition in which only SW1 is turned on, (ii) a condition in which only SW2 is turned on, and (iii) a condition in which SW1 and SW2 are turned off. Thereby the output voltage Vout is changed in three levels (V1, V2, V3).

Specifically, an output voltage V1 when only SW1 is turned on is expressed as follows.

$$V1=(R1+R6)*Vref/R6$$

An output voltage V2 when only SW2 is turned on is expressed as follows.

$$V2=(R1+(R6+R7))*Vref/(R6+R7)$$

An output voltage V3 when SW1 and SW2 are turned off is expressed as follows.

$$V3=(R1+(R6+R7+R8))*Vref/(R6+R7+R8)$$

In the regulator IC of the modification example in FIG. 6, each of the resistors R6, R7, R8 is constituted by a series resistance circuit in which unit resistors each having a resistance value of, for example, 10 kΩ are connected in series. Specifically, for example, in a case in which the resistance value of each of the resistors R6, R7 is set at 50 kΩ, five unit resistors are connected in series. In a case in which the resistance value of the resistor R8 is set at 100 kΩ, ten unit resistors are connected in series. Thus, a total of twenty unit resistors are required.

In another example, the resistor R2 in the voltage divider 12 of the embodiment in FIG. 1 is omitted. In this case, 50 kΩ, 100 kΩ, and 200 kΩ are selected as resistance values of the resistors R3, R4, R5. The output voltage Vout is changed in three levels (V1, V2, V3) like the above modification example. Unit resistors each having a resistance value of 10 kΩ constitute the resistors R3, R4, R5. In this case, five unit resistors for R3, ten unit resistors for R4, and twenty unit resistors for R5, that is, a total of thirty five unit resistors are required.

Thus, in a case in which a series resistance circuit in which unit resistors are connected in series is used as a resistor constituting the voltage divider 12, the modification example greatly reduces the number of unit resistors constituting the series resistance circuit, i.e., the area occupied by the resistors. It is reduced by about half. This is advantageous.

The invention made by the inventors has been described above in detail on the basis of embodiments. However, the present invention is not limited to the above embodiment. For example, in the above embodiment, the circuit in FIG. 4 is used as the bias circuit 15. Alternatively, circuits having other configurations such as the one disclosed in JP2017-134557A may be used.

In the above embodiment, the present invention is applied to a variable output voltage power supply of the series regulator type. However, the present invention may be used in a power supply of the shunt regulator type.

What is claimed is:

1. A power control semiconductor device, comprising:
a voltage input terminal to which a DC voltage is input;
an output terminal;
a voltage control transistor connected between the voltage input terminal and the output terminal;
a control circuit that controls the voltage control transistor according to an output voltage of the output terminal;
a bias circuit that generates a voltage that operates the control circuit based on the DC voltage input to the voltage input terminal; and
a first external terminal and a second external terminal to which a first external input signal and a second external input signal provided from an outside are input, respectively, to control the output voltage,
wherein the control circuit comprises:
a voltage divider that divides the output voltage of the output terminal;
an error amplifier that outputs a voltage corresponding to a potential difference between a predetermined reference voltage and a voltage divided by the voltage divider; and
a logic circuit that generates:
two or more control signals that changes the voltage divided by the voltage divider, which is input to the error amplifier, according to the first and second external input signals input to the first and second external terminals; and
a signal that stops operation of the bias circuit in response to one of combinations of the first external input signal and the second external input signal.

2. The power control semiconductor device according to claim 1, wherein:
the voltage divider comprises a first resistor element and a resistance circuit which are connected in series between the output terminal and a ground point,
the resistance circuit comprises lines each including a switch element and a resistor element in series, and
the switch elements are turned on/off by the two or more control signals.

3. The power control semiconductor device according to claim 1, wherein:
the voltage divider comprises a first resistor element and a resistance circuit which are connected in series between the output terminal and a ground point,
the resistance circuit comprises:
resistor elements in series; and
switch elements each connected between the ground point and a connection node between the resistor elements,
each of the resistor elements comprises a series resistance circuit in which unit resistors each having a predetermined resistance value are connected in series, and
the switch elements are turned on/off by the two or more control signals.

4. The power control semiconductor device according to claim 1, wherein:
the logic circuit comprises:
two or more transistors that are turned on/off by the first external input signal and the second external input signal input respectively to the first external terminal and the second external terminal; and
two or more current sources respectively connected in series with the transistors, and
when operation of the bias circuit is stopped by the signal from the logic circuit, currents of the two or more current sources are interrupted.

5. A variable output voltage power supply, comprising:
the power control semiconductor device according to claim 1; and
a controller that outputs the first external input signal and the second external input signal to the first external terminal and the second external terminal, respectively,
wherein the output voltage is changed according to the first external input signal and the second external input signal input to the first external terminal and the second external terminal from the controller.

6. A power control semiconductor device, comprising:
a voltage input terminal to which a DC voltage is input;
an output terminal;

a voltage control transistor connected between the voltage input terminal and the output terminal;

a control circuit that controls the voltage control transistor according to an output voltage of the output terminal;

a bias circuit that generates a voltage that operates the control circuit based on the DC voltage input to the voltage input terminal; and a first external terminal and a second external terminal to which a first external input signal and a second external input signal provided from an outside are input, respectively, to control the output voltage, wherein the control circuit comprises:

a voltage divider that divides the output voltage of the output terminal;

an error amplifier that outputs a voltage corresponding to a potential difference between a predetermined reference voltage and a voltage divided by the voltage divider; and a logic circuit that generates:

two or more control signals that changes the voltage divided by the voltage divider, which is input to the error amplifier, according to the first and second external input signals input to the first and second external terminals; and a signal that stops operation of the bias circuit in response to one of combinations of the first external input signal and the second external input signal, and wherein the logic circuit comprises:

two or more transistors that are turned on/off by the first external input signal and the second external input signal input respectively to the first external terminal and the second external terminal; and two or more current sources respectively connected in series with the transistors, and when operation of the bias circuit is stopped by the signal from the logic circuit, currents of the two or more current sources are interrupted.

7. The power control semiconductor device according to claim 6, wherein:

the voltage divider comprises a first resistor element and a resistance circuit which are connected in series between the output terminal and a ground point, the resistance circuit comprises a switch element and a resistor element in series, and the switch element is turned on/off by the two or more control signals.

8. The power control semiconductor device according to claim 7, wherein:

the resistance circuit includes lines each including the switch element and the resistor element in series, and the switch elements are turned on/off by the signal or the voltage from the logic circuit.

9. The power control semiconductor device according to claim 6, wherein:

the voltage divider comprises a first resistor element and a resistance circuit which are connected in series between the output terminal and a ground point, the resistance circuit comprises:

resistor elements in series; and a switch element connected between the ground point and a connection node between the resistor elements, each of the resistor elements comprises a series resistance circuit in which unit resistors each having a predetermined resistance value are connected in series, and the switch element is turned on/off by the two or more control signals.

10. The power control semiconductor device according to claim 9, wherein:

the resistance circuit comprises a plurality of switch elements each connected between the ground point and a connection node between the resistor elements, and the plurality of switch elements are turned on/off by the two or more control signals from the logic circuit.

11. A variable output voltage power supply, comprising:

the power control semiconductor device according to claim 6; and a controller that outputs the first external input signal and the second external input signal to the first external terminal and the second external terminal, respectively, wherein the output voltage is changed according to the first external input signal and the second external input signal input to the first external terminal and the second external terminal from the controller.

12. A variable output voltage power supply, comprising:

a power control semiconductor device comprising:

a voltage input terminal to which a DC voltage is input;

an output terminal;

a voltage control transistor connected between the voltage input terminal and the output terminal;

a control circuit that controls the voltage control transistor according to an output voltage of the output terminal;

a bias circuit that generates a voltage that operates the control circuit based on the DC voltage input to the voltage input terminal; and a first external terminal and a second external terminal to which a first external input signal and a second external input signal provided from an outside are input, respectively, to control the output voltage, wherein the control circuit comprises:

a voltage divider that divides the output voltage of the output terminal;

an error amplifier that outputs a voltage corresponding to a potential difference between a predetermined reference voltage and a voltage divided by the voltage divider; and a logic circuit that generates:

two or more control signals that changes the voltage divided by the voltage divider, which is input to the error amplifier, according to the first and second external input signals input to the first and second external terminals; and a signal that stops operation of the bias circuit in response to one of combinations of the first external input signal and the second external input signal; and a controller that outputs the first external input signal and the second external input signal to the first external terminal and the second external terminal, respectively, wherein the output voltage is changed according to the first external input signal and the second external input signal input to the first external terminal and the second external terminal from the controller.

13. The variable output voltage power supply according to claim 12, wherein:

the voltage divider comprises a first resistor element and a resistance circuit which are connected in series between the output terminal and a ground point, the resistance circuit comprises a switch element and a resistor element in series, and the switch element is turned on/off by the two or more control signals.

14. The variable output voltage power supply according to claim 13, wherein:

the resistance circuit includes lines each including the switch element and the resistor element in series, and the switch elements are turned on/off by the signal or the voltage from the logic circuit.

15. The variable output voltage power supply according to claim 12, wherein:

the voltage divider comprises a first resistor element and a resistance circuit which are connected in series between the output terminal and a ground point, the resistance circuit comprises:

resistor elements in series; and a switch element connected between the ground point and a connection node between the resistor elements, each of the resistor elements comprises a series resistance circuit in which unit resistors each having a predetermined resistance value are connected in series, and the switch element is turned on/off by the two or more control signals.

16. The variable output voltage power supply according to claim 15, wherein:

the resistance circuit comprises a plurality of switch elements each connected between the ground point and a connection node between the resistor elements, and the plurality of switch elements are turned on/off by the two or more control signals from the logic circuit.

* * * * *